(12) United States Patent
Kennedy et al.

(10) Patent No.: US 7,356,460 B1
(45) Date of Patent: Apr. 8, 2008

(54) CLAIM PROCESSING

(75) Inventors: James C. Kennedy, Houston, TX (US);
John Trustman, Gloucester, MA (US)

(73) Assignee: HealthEdge, Inc., New York, NY (US)

( * ) Notice: Subject to any disclaimer, the term of this patent is extended or adjusted under 35 U.S.C. 154(b) by 1004 days.

(21) Appl. No.: 09/833,097

(22) Filed: Apr. 10, 2001

Related U.S. Application Data

(60) Provisional application No. 60/221,173, filed on Jul. 27, 2000, provisional application No. 60/223,845, filed on Aug. 8, 2000, provisional application No. 60/258,969, filed on Dec. 29, 2000.

(51) Int. Cl.
*G10F 17/20* (2006.01)
*G10F 17/28* (2006.01)
*G06Q 50/00* (2006.01)

(52) U.S. Cl. .................. 704/9; 704/1; 704/2; 705/4

(58) Field of Classification Search ............ 704/1, 704/2, 9; 705/4
See application file for complete search history.

(56) References Cited

U.S. PATENT DOCUMENTS

| | | | | |
|---|---|---|---|---|
| 5,491,628 | A * | 2/1996 | Wakayama et al. ............ | 704/9 |
| 5,704,044 | A | 12/1997 | Tarter ......................... | 395/204 |
| 5,930,759 | A * | 7/1999 | Moore et al. ................. | 705/2 |
| 6,067,522 | A * | 5/2000 | Warady et al. ................ | 705/2 |
| 6,208,973 | B1 | 3/2001 | Boyer ......................... | 705/2 |
| 6,343,271 | B1 * | 1/2002 | Peterson et al. .............. | 705/4 |
| 6,351,265 | B1 * | 2/2002 | Bulman ....................... | 345/660 |
| 6,879,959 | B1 * | 4/2005 | Chapman et al. ............. | 705/2 |
| 6,922,810 | B1 * | 7/2005 | Trower et al. ............... | 715/534 |
| 6,931,434 | B1 * | 8/2005 | Donoho et al. .............. | 709/207 |

OTHER PUBLICATIONS

"ViPS SuperOp Auto-Adjudication Software", 8 pages (author and date of publication unknown).
"Tesia"—14 pages from "www.tesia.com" (author and date of publication unknown).
"Infomc"—18 pages from "www.infomc.com" (author and date of publication unknown).
"Athenahealth"—13 pages from "www.athenahealth.com" (author and date of publication unknown).
"HealthFusion"—19 pages from "www.healthfusion.com" (author and date of publication unknown).
"RealMed"—20 pages from "www.realmed.com" (author and date of publication unknown).
"QCSI"—22 pages from "www.qcsi.com" (author and date of publication unknown).
"CSC"—21 pages from "www.csc.com" (author and date of publication unknown).
"3M Health Information Services"—7 pages from "www.3m.com/market/healthcare/his/us/products" (author and date of publication unknown).

(Continued)

*Primary Examiner*—Tālivaldis Ivars Šmits
*Assistant Examiner*—Thomas E. Shortledge
(74) *Attorney, Agent, or Firm*—Goodwin Procter LLP

(57) ABSTRACT

The disclosure includes a computer-implemented method of processing a claim. The method includes receiving information corresponding to a context free grammar expression of a provision governing claim adjudication, receiving information corresponding to a claim, and based on the received information, determining whether the at least one provision applies to the claim.

71 Claims, 20 Drawing Sheets

OTHER PUBLICATIONS

"AMS News Room"—4 pages from "www3.amsinc.com" (author and date of publication unknown).

Best, "Large Systems: Health Claims Processing Workflow", from DesignFest 1996.

"4YourCare"—4 pages from "www.4yourcare.com" (author and date of publication unknown).

"eBenX"—16 pages from "www.ebenx.com" (author and date of publication unknown).

"ChartKeeper"—8 pages from "www.vantagemed.com" (author and date of publication unknown).

"Workscape"—10 pages from "www.workscape.com" (author and date of publication unknown).

"Axolotl"—14 pages from "www.axolotl.com" (author and date of publication unknown).

"McKessonHBOC Sets UP New E-Health Unit", Jun. 2000 (author unknown).

* cited by examiner

420

Contract

422 — identifier "Sample Supplier Contract"

424 — effective-date "01-01-2000 12:00 AM"
expiration-date "01-01-2000 12:00 AM"

426 — Fee Calculation Policies
calculate with zip code "77011"
calculate usual and customary with the 75th percentile 428 —
Reimbursement Schedule General // In return for the provision of Covered Services to Commercial HMO Enrollees
// referred to Physician by a PIP Physician, Physician will be reimbursed on a fee
// for service basis. The reimbursement will be equal to the lesser of:
// (1) 110% of the RBRVS allowable applicable at the time of service in Physicians
// geographic location; and
// (2) Physician's usual, customary, and reasonable charge to patients for the type
// of service in question, less any applicable co-payment. For those covered
// services for which an RBRVS allowable has not been determined, Physician
// shall be reimbursed in an amount equal to 60^ of the amount of Physician's
// usual, customary, and reasonable charge to patients for the type of service in
// question 432 — For covered services other than TOS "4", "5", "6"; service-category "Pathology", "Pharmaceuticals" delivered to members of product "Commercial HMO Plans" the allowed fee is the lower of the following options:
option: 110% of RBRVS, if service calculation is undetermined then 60^ of the usual and customary costs;
option: the usual and customary costs

FIG. 10

| Element | Score Adjustment |
|---|---|
| UPIN | + 20 |
| Last Name | + 6 |
| Soundex last name | + 3 |
| First name | + 2 |
| Soundex first name | + 1 |
| SSN | + 6 |
| Zip + 4 POS | + 6 |
| Full Street Address | + 3 |
| Partial Street Address | + 2 |
| City POS | + 2 |
| State POS | + 1 |
| . | |
| . | |

572  574

| Element | Score Adjustment |
|---|---|
| Member/Subscriber ID | + 10 |
| Last Name | + 6 |
| Soundex last name | + 3 |
| First name | + 2 |
| Soundex first name | + 1 |
| DOB | + 6 |
| Zip + 4 | + 6 |
| Full Street Address | + 3 |
| Partial Street Address | + 2 |
| City POS | + 2 |
| State POS | + 1 |
| . | |
| . | |

614     616

612

CLAIM PROCESSING

REFERENCE TO RELATED APPLICATIONS

This application claims priority from co-pending U.S. Provisional Application Ser. No. 60/221,173, filed Jul. 27, 2000, entitled "Systems and Methods for Claims Adjudication"; Ser. No. 60/223,845, filed Aug. 8, 2000, entitled "Systems and Methods for Health Care Management"; and Ser. No. 60/258,969, filed Dec. 29, 2000, entitled "Claim Processing". These applications are incorporated by reference herein in their entirety.

BACKGROUND

Insurance protects individuals and organizations from various expenses. For example, many people purchase car and health insurance to guard against the high costs of car accidents and healthcare. Commonly, insurance agreement provisions govern the benefits owed for a particular claim. The process of determining benefits for a particular claim is known as "claim adjudication."

Large insurers receive countless claims each day. Despite technological advances, however, claim examiners often process many of these claims by hand. While examiners often become reasonably consistent in their interpretations of agreement provisions, adjudication of a claim sometimes depends as much on the desk that the claim landed on as the merits of the claim. In addition to differing interpretations of provisions, processing claims by hand adds administrative expense and delay, and can introduce human error into the claims adjudication process.

The healthcare industry, plagued by an expensive, slow-moving infrastructure, suffers many of the claim adjudication problems described above. A procedure as simple as a check-up can implicate any number of coverage agreements between different entities in the healthcare landscape. Many of these agreements include hundreds of different coverage provisions, many of which reference one another. Additionally, some provisions reference provisions in a different agreement, making the task of determining a claim adjudication outcome even more difficult.

FIG. 1 illustrates the myriad of contractual relationships potentially implicated when a patient receives medical care from a practitioner. As shown, a purchaser 110, such as an employer, enters into a plan contract relationship with a healthcare company 112. Provisions in the plan contract specify coverage provided to subscriber 104 members 102 (e.g., employees) for medical services. A plan may also cover members 102 other than employee's such as an employees family members and dependents.

Typically, when a member 102 receives care from a practitioner 106, the practitioner 106 submits a request for reimbursement to the healthcare company 112. The reimbursement owed the practitioner 106 may be governed by a provider contract 116. The provider contract 116 may apply to a group of practitioners, such as practitioners at a particular hospital or clinic.

Instead of a direct relationship with a health care company, providers 108 may belong to a provider network 114 such as an HMO (Health Maintenance Organization). The provider network 114 may agree to provide healthcare for the health care company 112 in accordance with a provider contract 119. The provider(s) 108, in turn, may agree to provide healthcare services for the provider network 114 in accordance with a provider sub-contract 118. A determination of reimbursement ultimately owed a practitioner 106, in this example, hinges on both the provider contract 119 provisions and the provider sub-contract 118 provisions.

Due to this web of agreements, providers 108 sometime spend months awaiting payment, uncertain whether they will receive full or partial reimbursement, if any. Additionally, the documentation provided with payments often lacks much in the way of explanation. For example, large provider groups 108, such as hospitals, often receive checks for millions of dollars, accompanied only by a terse description. Weeks or months later, these hospitals may receive hundreds of pages of computer printout often requiring a claim-by-claim investigation to determine an accounting of the amount received or withheld. Similarly, health plan members 102 often receive bills for an outstanding balance months after a visit.

SUMMARY

In general, in one aspect, the disclosure describes a computer-implemented method of processing a claim. The method includes receiving information corresponding to a context-free grammar expression of at least one provision governing claim adjudication, receiving information corresponding to a claim, and, based on the received information, determining whether the at least one provision applies to the claim.

In general, in another aspect, the disclosure describes a computer-implemented method of processing a health insurance claim. The method includes receiving information corresponding to a context free grammar expression of different provisions governing adjudication of the claim, receiving information corresponding to a claim, and, based on the received information, determining at least one of the provisions that applies to the claim.

In general, in another aspect, the disclosure describes a computer-implemented method of representing healthcare insurance provisions. The method includes receiving information corresponding to healthcare insurance provisions encoded in a context-free grammar and parsing the receiving information.

In general, in another aspect, the disclosure describes a computer-implemented method of analyzing provisions included in an agreement. The method includes receiving identification of at least one provision that applies to a claim, receiving identification of the application of the provision to the claim, storing the received identification of the provision and the received identification of the application of the provision; and aggregating the received identification of the application of the provision with other identifications of the application of the provision for other claims.

In general, in another aspect, the disclosure describes a method of health care management. The method includes providing context-free grammar production rules for expressing health care information, and encoding health care information in accordance with the context-free grammar.

Advantages will become apparent in view of the following description, including the figures and the claims.

BRIEF DESCRIPTION OF THE DRAWINGS

FIG. 10 is a listing of a provider contract expressed in a context free grammar.

DETAILED DESCRIPTION

Figure 1:
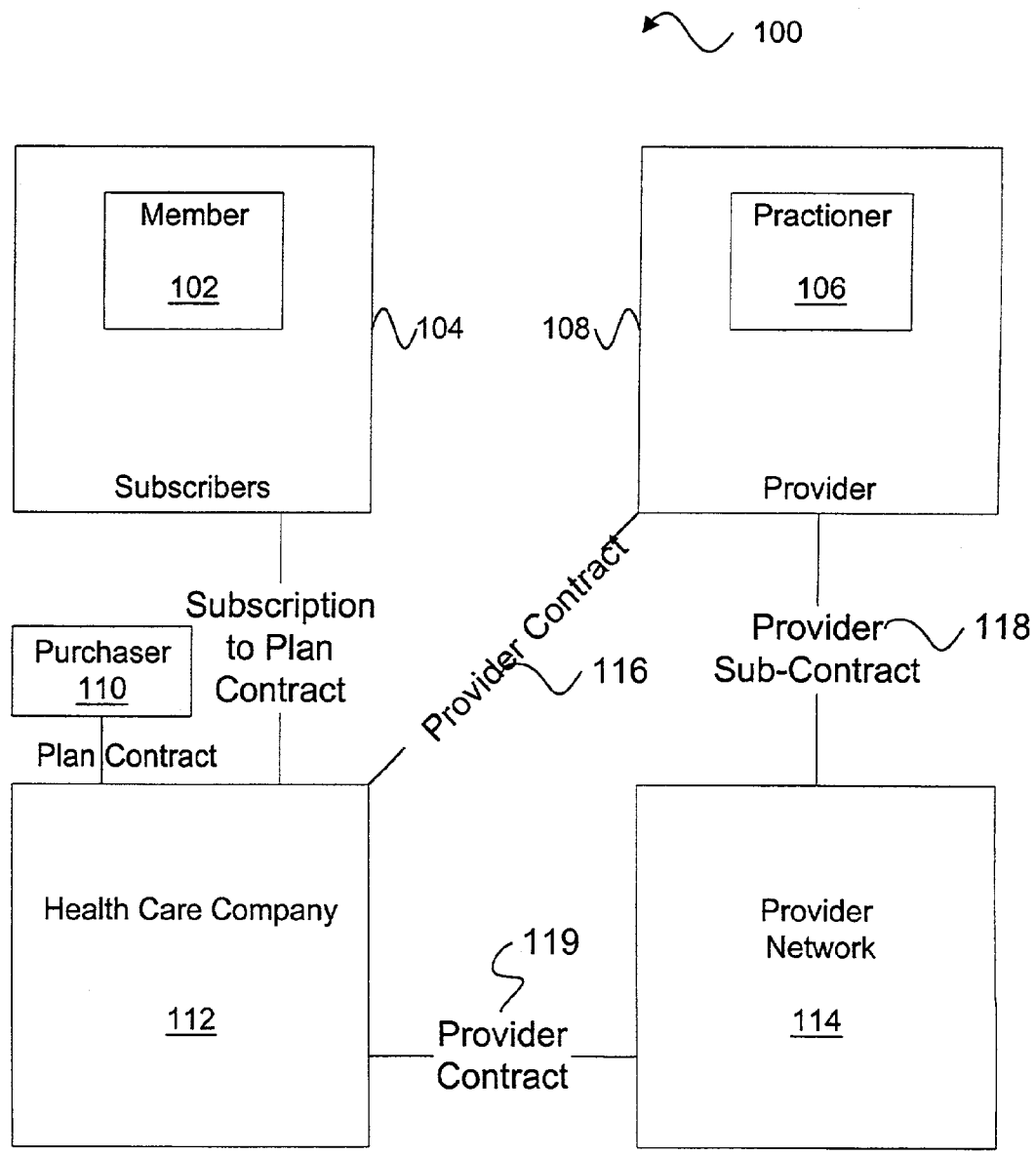
FIG. 1 is a diagram illustrating agreements between different healthcare entities.
Figure 2:
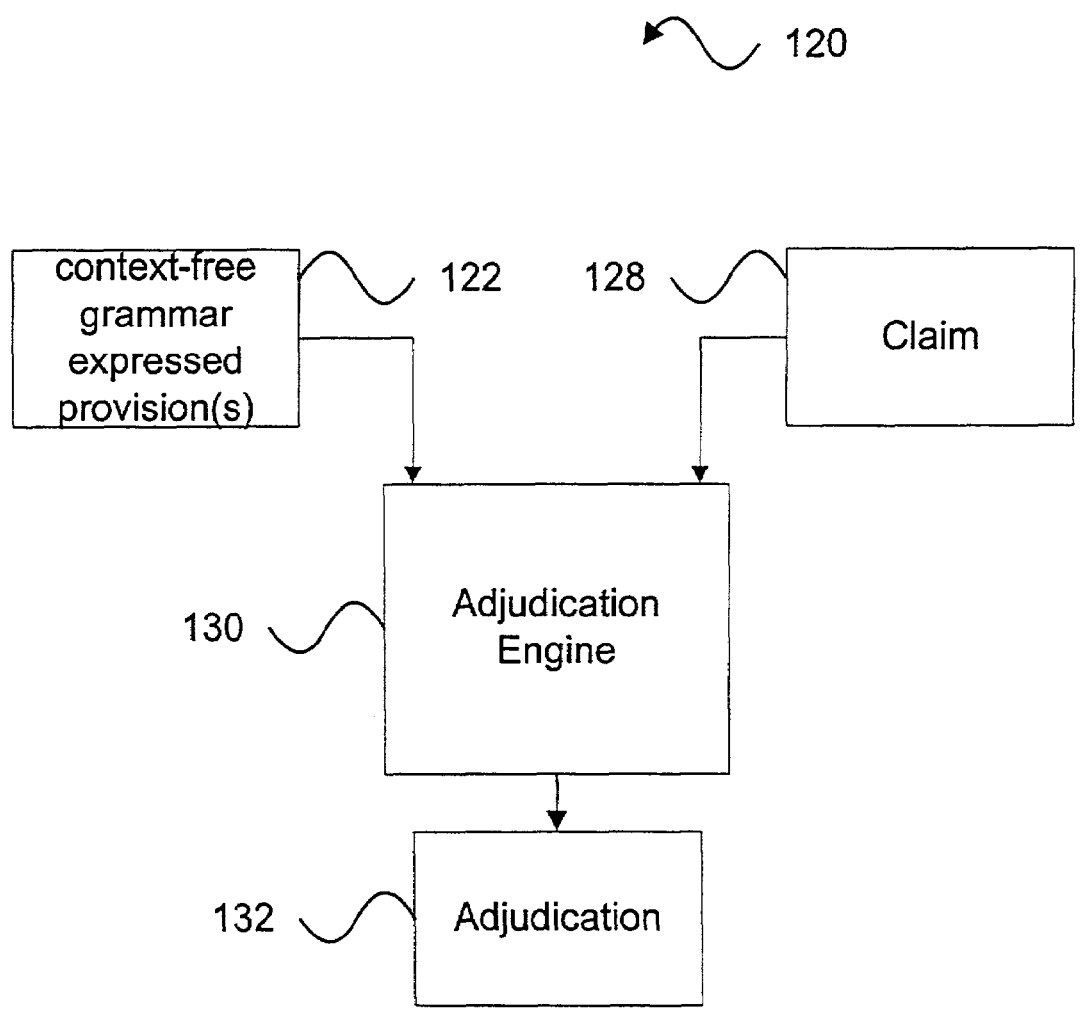
FIG. 2 is a flow-diagram illustrating automatic claim adjudication.

FIG. 2 shows a system 120 that automatically adjudicates a claim 128 based on a set of one or more provisions 122 expressed in a context-free grammar. Expressing the provisions 122 in a context-free grammar eases computer "understanding" of the provisions. For example, an adjudication engine 130 can automatically parse a provision to determine whether the provision applies to a claim and to determine the provision's significance if it does. Thus, the adjudication engine 130 can process the provisions 122 to adjudicate a claim 128 with little, if any, human intervention. The engine 130 need not completely cut out human involvement in the claim adjudication process. For example, the engine 130 may identify a claim requiring human review, such as claims exceeding a designated amount or having unusual characteristics.

The system 120 shown in FIG. 2 can greatly reduce administrative costs and speed claim adjudication. For example, during patient check-in, the system 120 can determine, in real-time, the extent to which a patient's plan will cover a particular test.

In addition to claim adjudication, the system 120 can provide other valuable features. For example, as described in conjunction with FIGS. 19-20, procedures can identify potentially conflicting provisions before a company offers a plan to subscribers. Additionally, the system 120 can log and analyze the effect of different claim provisions. For example, the system 120 can provide an actuary with statistics describing the likelihood of provision application and the costs associated with the provision.

Figure 3:
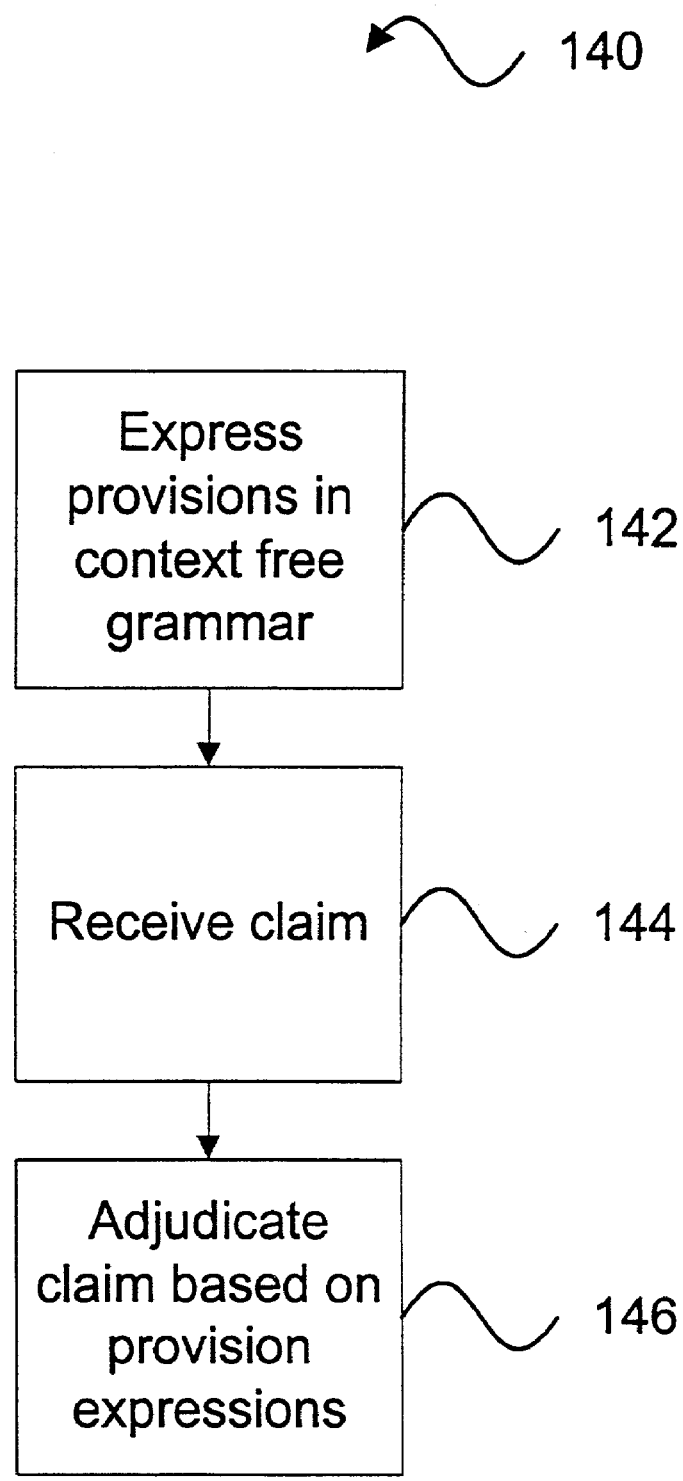
FIG. 3 is a flow-chart of a process for automatic claim adjudication.

FIG. 3 shows a flow-chart of a process 140 for automatically processing a claim. As shown, the process 140 operates on provisions expressed 142 in a context-free grammar. Again, the provisions may include application criteria and a specification of a result of the provision's application. To adjudicate 146 a received 144 claim, the process 140 identifies provisions having criteria satisfied by characteristics of the claim such as the claim type and information about the provider and patient. The process 140 then determines the results specified by the applicable provisions.

The process 140 shown in FIG. 3 may be implemented as instructions that process claims in real-time. Alternatively, the process 140 may proceed in a batch mode, for example, that processes claims received during the day each evening.

The system 120 and process 140 shown in FIGS. 2 and 3 have broad applicability. For example, automatic adjudication of claims can reduce costs and speed resolution of healthcare, auto, life insurance, and other claims. For purposes of illustration, a description of a system that automatically adjudicates claims for healthcare coverage follows.

Figure 4:
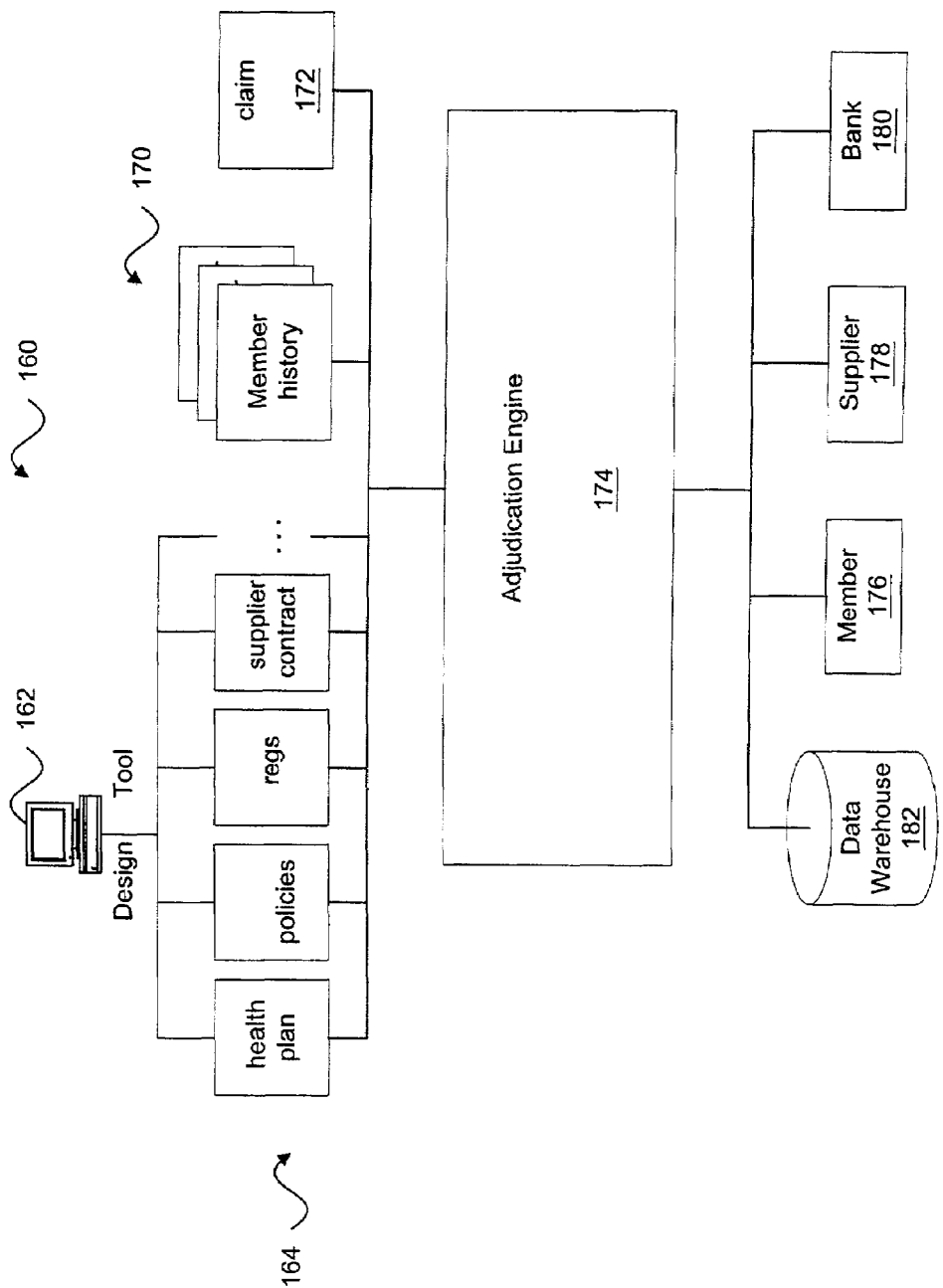
FIG. 4 is a flow-diagram illustrating automatic adjudication of a healthcare claim.

FIG. 4 shows an example of a system 160 for automatically adjudicating healthcare claims 172. As shown, the system 160 can process encoded provisions 164 of a healthcare plan describing benefits owed to a healthcare plan member. The system 160 can also process encoded provider contract provisions that describe reimbursement owed a provider for providing healthcare services and/or goods. The system 160 can also process other provisions including provisions representing healthcare company policies, provisions expressing regulations (e.g., governmental requirements for providing medically necessary care), and so forth.

Again, the provisions 164 may express application criteria. For example, a provision for a particular medical service may express criteria regarding a patient's age, gender, treatment facility, frequency, and so forth. For instance, a provision may limit coverage for certain examinations for younger patients.

More than one provision may apply to a given claim. Further, the provisions that apply may be found in different agreements. For example, a healthcare plan provision may refer to applicable provider contract provision for a determination of reimbursement and/or member contribution.

As shown, an adjudication engine 174 provides information corresponding to the context-free grammar expression of the provisions 164 to the data warehouse 182. For example, the engine 174 may receive the text of the context-free grammar provisions for parsing and/or data corresponding to a previous parsing of the provisions. Based on the claim 172 and the provisions 164, the engine 174 identifies and applies applicable provisions. To evaluate provision criteria, the engine 174 may access provider and/or member information 170 such demographic information of a member. The member information 170 may also include a history of prior medical services provided to the member. The adjudication engine 174 may access this information 170 to determine when a member exceeds a coverage limit, has not met a coverage deductible, or no longer qualifies for a benefit.

In addition to automatic adjudication, the system 160 can notify parties 176, 178 of the adjudication. For example, the adjudication engine 174 may automatically generate an explanation of benefits for delivery to a member 176 making a claim 172. Similarly, the engine 174 may automatically generate an explanation of reimbursement for a provider 178. These forms of documentation can help hospitals and administrative organizations quickly settle accounting issues associated with a claim. Additionally, based on the adjudication engine's 174 analysis, the system 160 may wire instructions to a bank 180 that automatically adjusts subscriber and/or provider accounts in accordance with a determined adjudication. As described in conjunction with FIG. 13, the system 160 can also log adjudication outcomes such as applicable provisions and their role in the adjudication.

Figure 18:
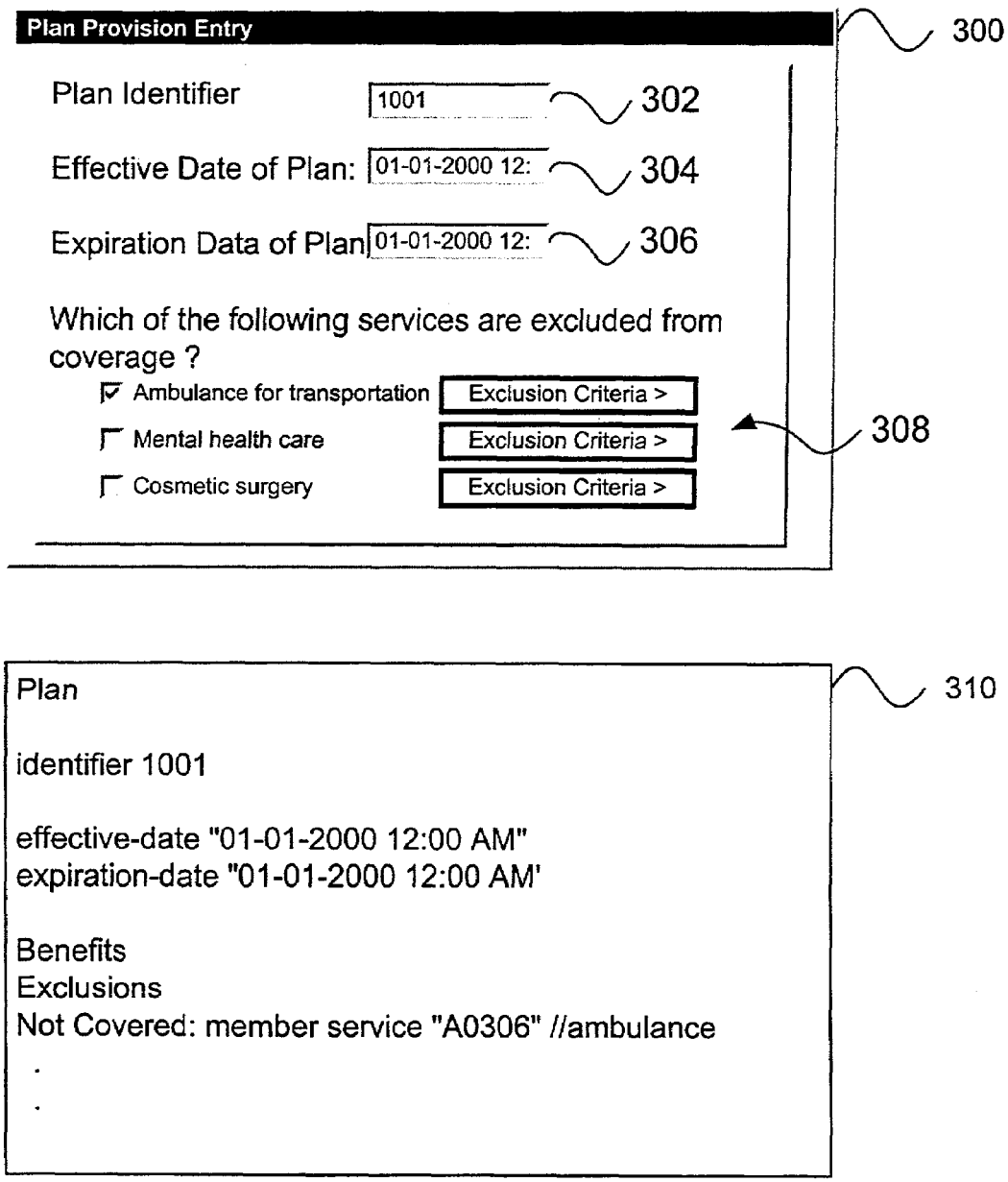
FIG. 18 is a diagram illustrating a user interface for generating provisions conforming to a context free grammar.

To aid users in the task of expressing provisions in a context free grammar, the system 160 may feature a design tool 162 (described in detail in conjunction with FIG. 18). The design tool 162 enable users to specify provision elements by interacting with familiar graphical user interface controls such as fields, radio buttons, and so forth. Based on the received information, the tool 162 can generate provision expressions in the context free grammar.

Figure 5:
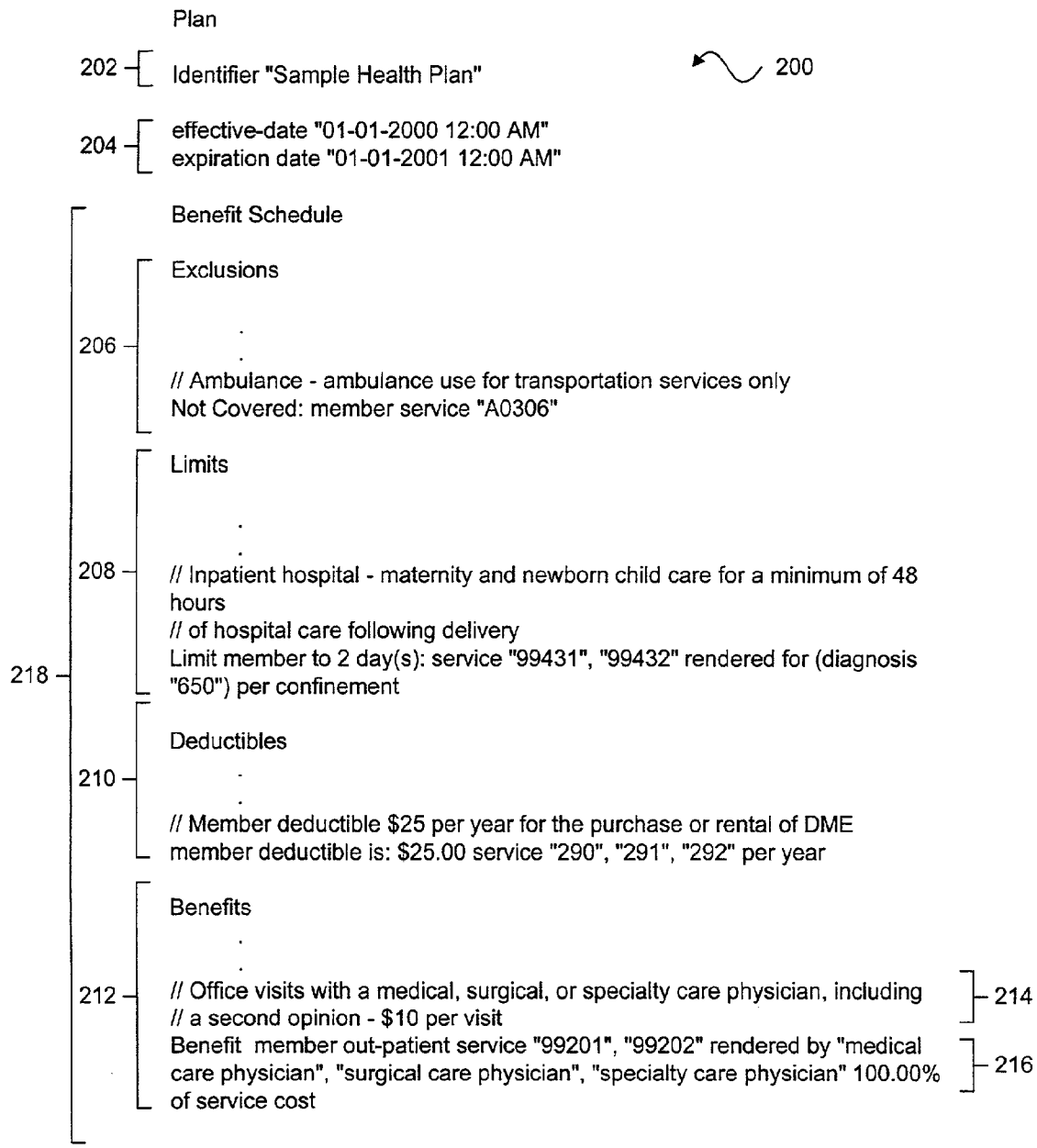
FIG. 5 is a listing of a healthcare plan expressed in a context free grammar.

FIG. 5 shows an example of a health plan 200 expressed in a context free grammar. Appendix A includes a complete listing of a sample health plan 200. While the context free grammar imposes a precise organization to the plan 200 provisions, a person can, nevertheless, easily read and understand the plan 200. In fact, entities may append the context-free grammar representation of agreement provisions to a contract or even include the context-free grammar representation as the sole embodiment of an agreement.

As shown, the plan 200 can include comments 214, text following "//" characters, that can increase the readability of the plan 200. As shown, the comments 214 can feature the actual agreement text corresponding to the context free grammar expression of the provisions.

As shown, the plan 200 includes a wide variety of provisions. For example, one set of provisions 204 specifies the effective time period of the plan. The plan 200 also includes provisions 218 that specify plan member coverage for different medical services. For example, the plan 200 includes a provision 216 that specifies benefits (e.g., "100% of service cost") for particular out-patient services rendered by medical care physicians, surgical care physicians, and/or specialty care physicians. The services covered by the provision can be identified by an AMA (American Medical Association) code. For example, AMA code "99201" corresponds to an "office or other out-patient visit for a new patient".

During automatic claim adjudication, an adjudication engine can evaluate the provision's 216 criteria using information included in the claim, about a subscriber, about a provider, and/or other information. For example, in the case of provision 216, the engine can use claim information to determine whether the claim is for "out-patient" service, whether the claim is for a service identified by the codes "99201" or "99202", and whether the care was rendered by an appropriate medical professional. If the engine determines a provision matches a claim, the engine can process indemnification information included in the provision 216 to determine a particular amount owed.

As shown, the plan 200 groups provisions governing benefit determinations into a benefit schedule 218 that includes provisions expressing exclusions 206 from coverage, limits 208 to coverage, deductibles 210, and benefits 212. Different groups 206, 208, 210, 212 may include one or more provisions that apply to a particular claim. For example, the benefit provisions 212 may express a particular amount of coverage for a medical service. A limits 208 provision may, however, limit a member to some maximum total for the service. If the amount of coverage specified by the benefit provisions 212 exceeds the amount specified in the limits provisions 208, the adjudication engine can apply both provisions, and, thus, cap the member's coverage at the amount specified by the limit provision. Organizing the provisions in different categories can speed processing of a claim. For example, if an exclusion applies, the engine may not need to evaluate limit, deductible, or benefit provisions.

Figure 6:
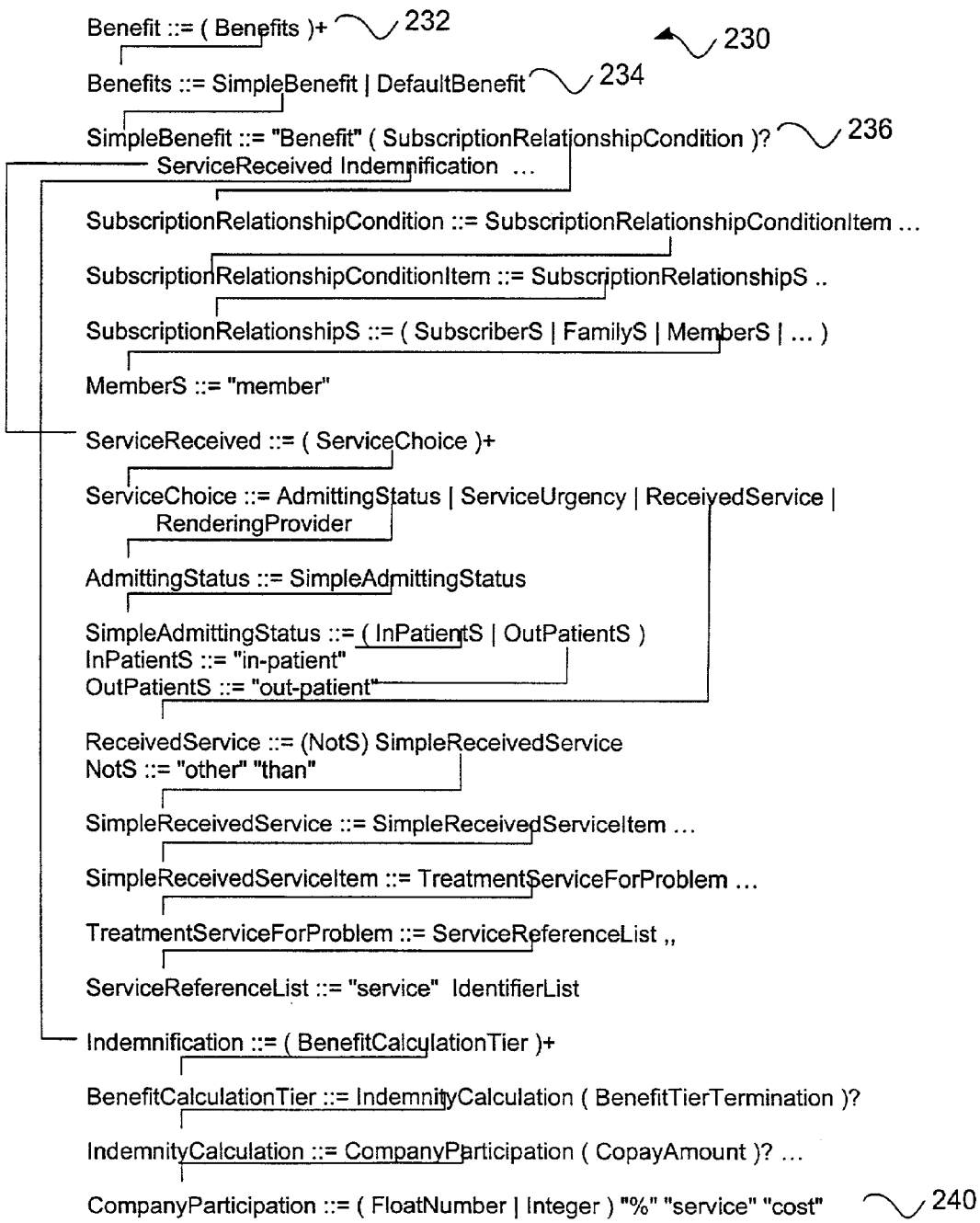
FIG. 6 is an example of BNF (Backus-Naur format) production rules for expressing provisions.

FIG. 6 shows a portion 230 of the context free grammar rules used in expressing provisions. Appendix B lists a complete set of the rules. As shown, the rules conform to a Backus-Naur formal grammar known as EBNF (Extended Backus-Naur Format) syntax. The EBNF rules formally define the grammar of a "healthcare provisions" language. While the language features a compact set of rules, thousands of different agreements successfully expressed by these rules attest to their flexibility. The rules also provide a rich set of logic (e.g., boolean and conditional logic) to express provision criteria and outcomes. The rule framework also permits easy integration of additional language semantics as needed.

The EBNF rules, known as production rules, specify valid substitutions for a symbol on the left-hand side of ":=" characters. Valid substitutions appear on the right-hand side. Valid substitutions can include symbols and terminals. The only distinction between symbols and terminals is that symbols appear on a left-hand side of at least one production rule, while terminals do not.

According to EBNF notation, a "|" character separates alternative substitution values for a symbol.

For example, a production rule 234 for a "Benefits" symbol 232 may be substituted with either a "SimpleBenefit" symbol or a "DefaultBenefit" symbol.

A rule can also use notation specifying symbol or terminal repetition or allowable omission. For example, a "?" character indicates zero or one repetitions, a "+" indicates one or more repetitions, and an "*" indicates zero or more symbols or terminals. For example, a production rule 236 for a "SimpleBenefit" may be replaced by the "Benefit" terminal, zero or more repetitions of a "SubscriptionRelationship Condition" symbol, a single "ServiceReceived" symbol, and a single "Identification" symbol.

Figure 7:
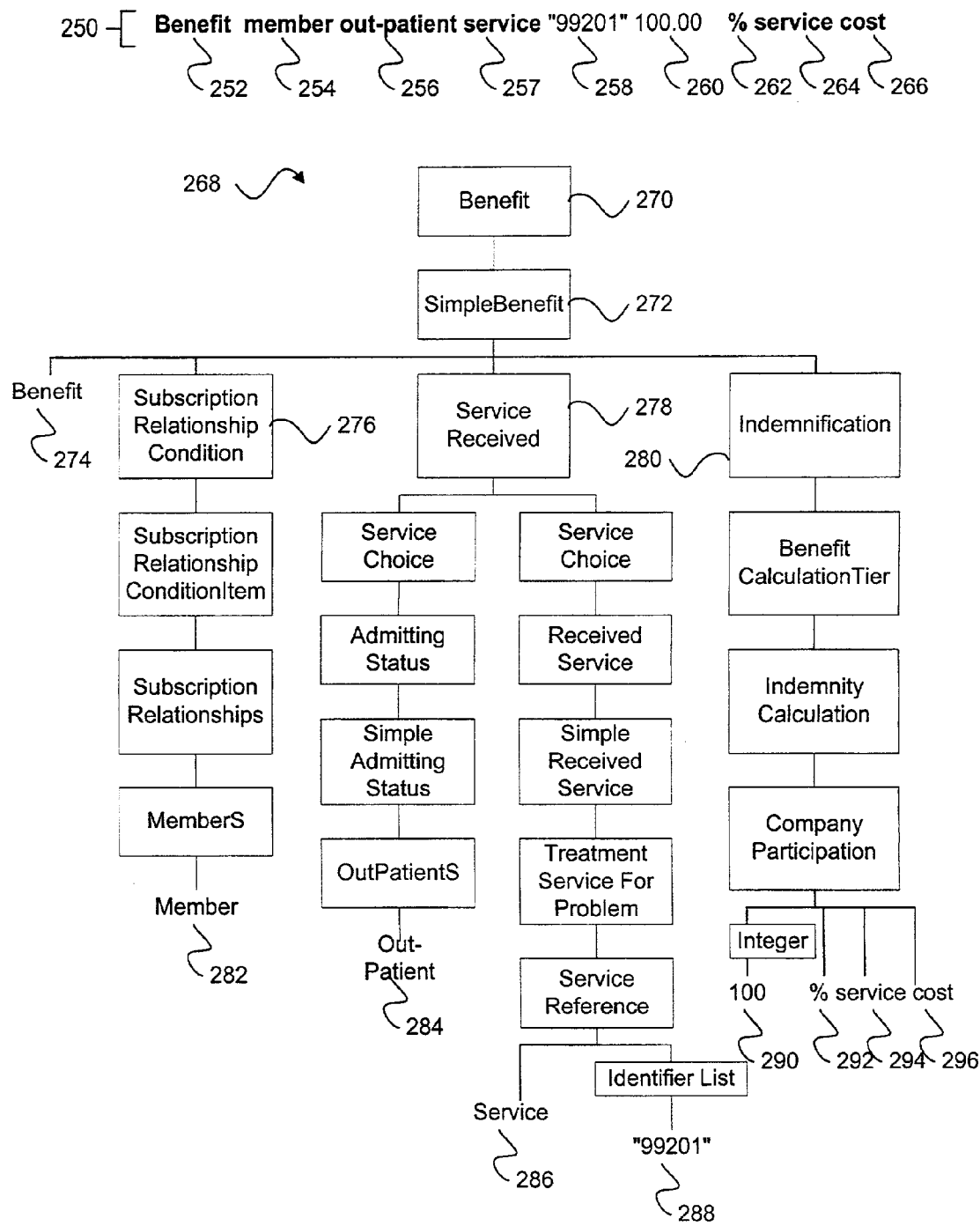
FIG. 7 is a diagram illustrating a tree corresponding to a provision expressed in a context free grammar.

FIG. 7 shows a provision 250 expressed using the production rules. More particularly, the provision 250 features a series of terminal values 252-266. That is, the term "Benefit" 252 in the provision 250 corresponds to the "Benefit" terminal of production rule 236. Similarly, the "%" 262 "service" 264 "cost" 266 terminals correspond to the terminals specified by production rule 240.

Expressing a provision 250 in the context-free grammar enables a computer to process the provision much more easily than processing provisions expressed in a natural language. For example, a procedure can parse the provision 250 to identify different provision 250 elements.

As shown in FIG. 7, parsing a provision 250 can generate a tree 268. Tree nodes, such as nodes 270-272, 276-280, corresponding to symbols have one or more child nodes. Tree nodes, such as nodes 274, 282-296, corresponding to terminals, do not have child nodes.

A procedure can use the tree 268 to determine whether a provision 250 applies to a claim. To make this determination, the procedure generally proceeds in a recursive, top-down fashion. For example, to determine whether the claim satisfies a "SubscriptionRelationshipCondition" 276, the procedure determines whether the claim satisfies the node's 276 child, a "SubscriptionRelationshipConditionItem" node. Similarly, to determine whether the claim satisfies the "Subscription RelationshipConditionItem", the procedure determines whether the claim satisfies a "SubscriptionsRelationships" node. The evaluation continues until, ultimately, the procedure determines whether the claim is for a "member" 282. If so, the "MemberS" node is satisfied, and, as a result, the "Subscription Relationships", "Subscription-RelationshipConditionItem", and "SubscriptionRelationshipCondition" 276 nodes are also satisfied.

The procedure may depart from a strict top-down processing, for example, to reflect domain-specific knowledge. For example, the tree 268 includes both the provision application criteria and the results of applying the provision. That is, the sub-trees rooted by the "SubscriptionRelationshipCondition" 276 and "ServiceReceived" 278 nodes embody the provision's application criteria, while the sub-tree rooted by the "Indemnification" node 280 specifies the benefits owed. A procedure using the tree 268 may omit traversal of the "Indemnification" sub-tree if a claim fails to satisfy both the "Subscription RelationshipCondition" 276 or "ServiceReceived" 278 nodes.

Figure 8:
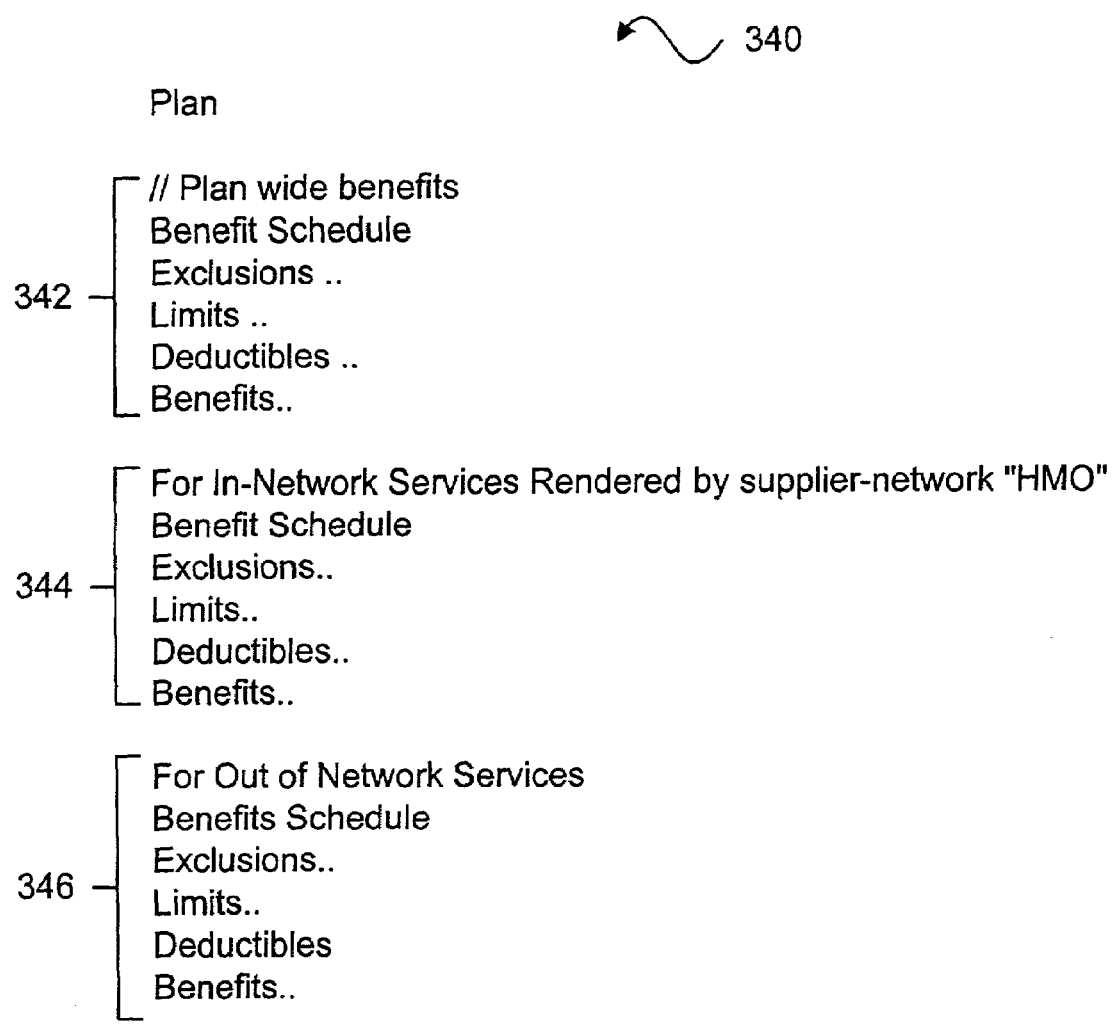
FIG. 8 is an example of a health plan that includes different benefit schedules.

The tree 268 corresponding to the provision 250 may be a sub-tree of a larger tree including many different provisions. For example, as shown in FIG. 8, a health plan 340 can include multiple benefit schedules 342-346. As shown, the plan 340 includes a default benefit schedule 342, an in-network benefit schedule 344 for medical services provided by a network provider, and an out-of-network benefit schedule 346. Each schedule 342-346 can include its own set of exclusion, limit, deductible, and benefit provisions. The adjudication engine can determine and select the applicable benefit schedule from information included in the claim such as identification of the service provider, the service location, and so forth.

Figure 9:
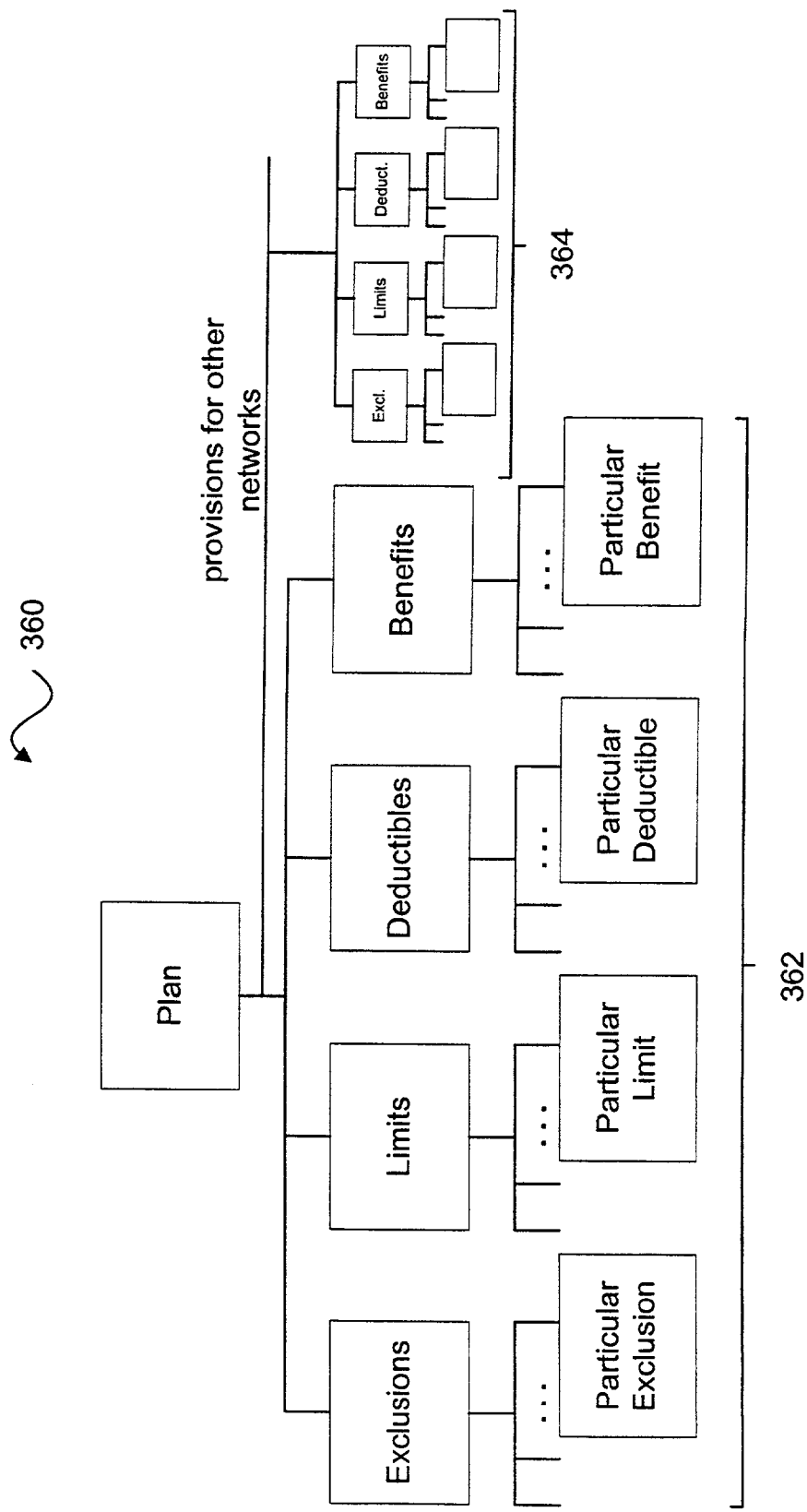
FIG. 9 is a diagram of a tree corresponding to a health plan that includes different benefit schedules.

FIG. 9 depicts a parse tree 360 generated from the health plan of FIG. 8. The tree 360 includes a sub-tree 362, 364 for each plan schedule. After determining the applicable benefit schedule 362-364, the engine need only concern itself with information represented in that benefit schedule's tree. That is, rather than traversing the entire tree 360, a procedure can "jump" or "index" to a particular sub-tree of interest. Pruning the tree in this matter can greatly increase claim processing speed and enable an auto-adjudication system to keep up with the, potentially, vast number of claims received.

The sub-trees 362, 364 for each benefit schedule further include sub-trees corresponding to the different provision groupings of a benefit schedule. For example, a benefit schedule may include an exclusions sub-tree, a limits sub-tree, a deductibles sub-tree, and a benefits sub-tree. By traversing a sub-tree in accordance with healthcare domain-specific information, the engine can process information in the sub-trees to avoid a complete sub-tree traversal when possible. For example, a process can traverse the exclusions sub-tree to identify provision matches before traversing the other sub-trees. If the exclusions sub-tree includes a matching provision, the procedure may not need to traverse the other sub-trees. That is, since a provision excludes coverage, any applicable limits, deductibles, or benefits, do not matter. Optimizations such as these can become increasingly important as the number of claims processed increases.

As described above, the context-free grammar can express provisions and health-care information other than those found in a healthcare plan. For example, FIG. 10 illustrates an example of a provider contract 420 including provisions expressed in a context-free grammar. An example of a contract 420 is included as Appendix C. Like the health plan, the provider contract 420 can include a wide variety of provisions including provisions 422 describing the identifier and provisions 424 governing the effective dates of the contract. As shown, the provider contract 420 also includes provisions that express calculation policies 426. For example, standard fee schedules for different medical services vary for different locations. Thus, a fee calculation provision 426 indicates that such schedules should be accessed using a particular zip code. Additionally, as shown, a fee calculation policy provision 429 indicates that service reimbursement for "usual and customary" costs should be paid at the 75th percentile of reported "usual and customary" fees.

The provider contract 420 also includes a reimbursement schedule 428. Provisions, such as provision 432, in the reimbursement schedule 428 can specify the reimbursement owed to a provider for providing a particular healthcare service. The provision 432 expresses both criteria for reimbursement and information for determining the reimbursement amount owed if the criteria are satisfied. For example, in the provision 432 shown, a healthcare provider will receive one of two different possible reimbursement options if a service provided to a particular recipient falls in the designated type of service categories.

Typically, a provider contract 420 will include other provisions in addition to the reimbursement schedule 428. For example, a provider contract 428 can include provisions regarding rosters, referral requests, and so forth.

Figure 11:
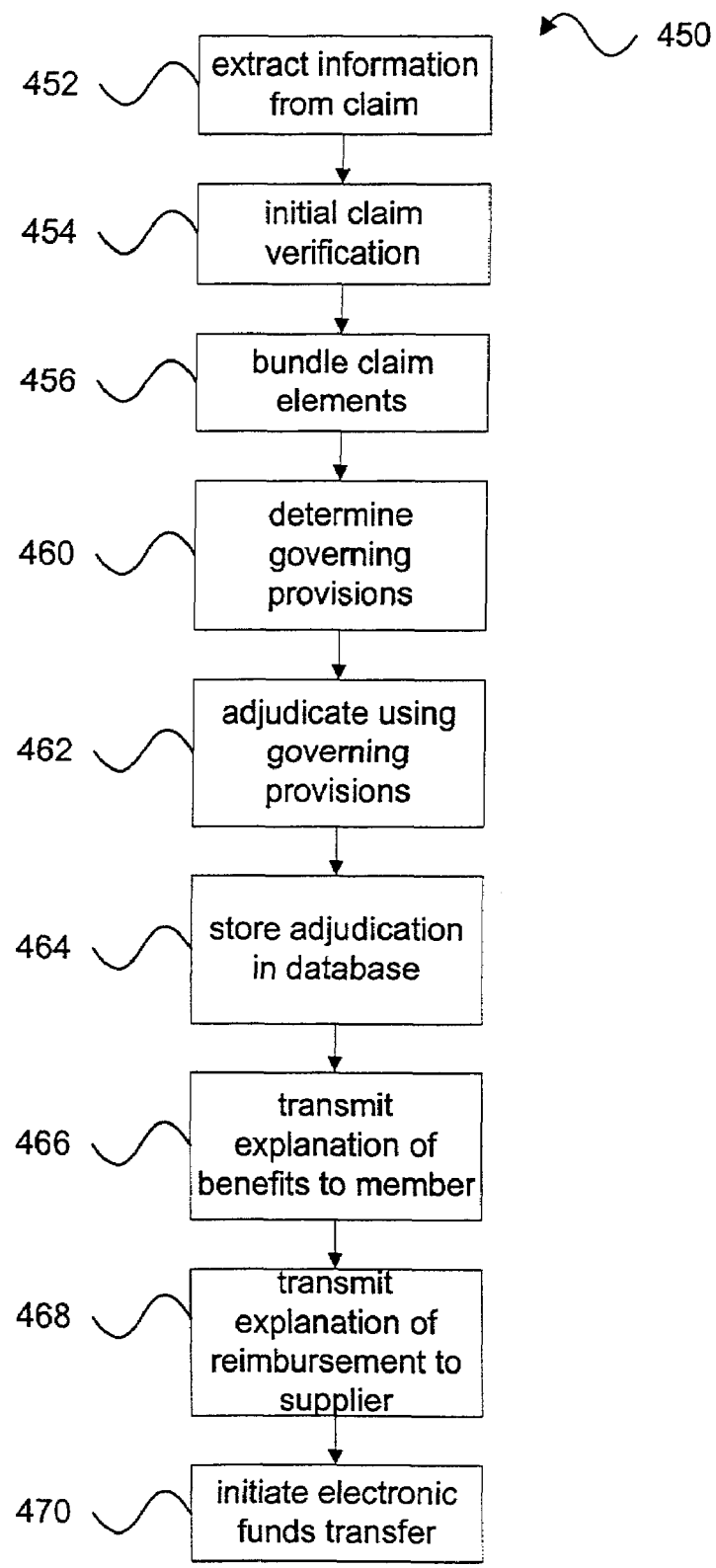
FIG. 11 is a flow-chart of a process that automatically adjudicates healthcare claims.

FIG. 11 shows a flowchart of a process 450 for automatically adjudicating a claim for healthcare benefits. The process 450 can begin with extraction of claim information 452. For example, a hardcopy of a HCFA or UB (Universal Billing) 92 form may be optically scanned. Alternatively, claim information may already be encoded in a data structure. For example, a procedure may receive a claim encoded for electronic transfer using EDI (electronic data interchange).

After extracting claim information 452, the process 450 can make an initial determination 454 that the claim is, at least, plausibly valid (known as a "clean claim"). For example, the determination 454 can ensure that the claim refers to a legitimate member of the specified health plan, to a valid provider, and does not duplicate a previously received claim. The determination 454 may include other safeguards against improper claims. For example, the determination 454 may ensure that a claimed service is appropriate for the member, for example, based on the claim service code and the age, gender, and/or other characteristics of the member. This initial determination 454 can quickly dispose of many claims without merit.

The process 450 may also attempt to alter claim elements to improve processing. For example, a single claim form frequently includes a number of different claims for medical services and/or products. That is, a single claim may request coverage for a service, equipment used, and transportation. Thus, the process 450 may attempt to bundle 456 the different codes included in one or more claim forms into a set of fewer codes. Similarly, the process 450 may replace a single code with an equivalent or more appropriate code.

After any preliminary processing, the adjudication engine identifies agreements (e.g., plans and contracts) including provisions relevant to the claim. Thereafter, the process can evaluate the provisions in these agreements. For example, the adjudication engine determines 460 which of the different benefit schedules included in a health plan apply to the claim. After determining 460 the applicable benefit schedule, the process 450 searches the benefit schedules exclusions, limits, deductibles, and benefits for applicable provisions. Based on the applicable provisions, the process can adjudicate 462 the claim. After adjudication 462, the process 450 may log 464 information about the adjudication, such as applicable provisions and the resolution, for subsequent analysis. Additionally, the process 450 automatically generates notification (e.g., electronic or hardcopy) of the adjudication. That is, the process can generate an explanation of benefits to members 466 and an explanation of reimbursement 468 to service providers. Additionally, the process 450 may initiate 470 electronic transfers of funds in accordance with the adjudication.

Figure 12:
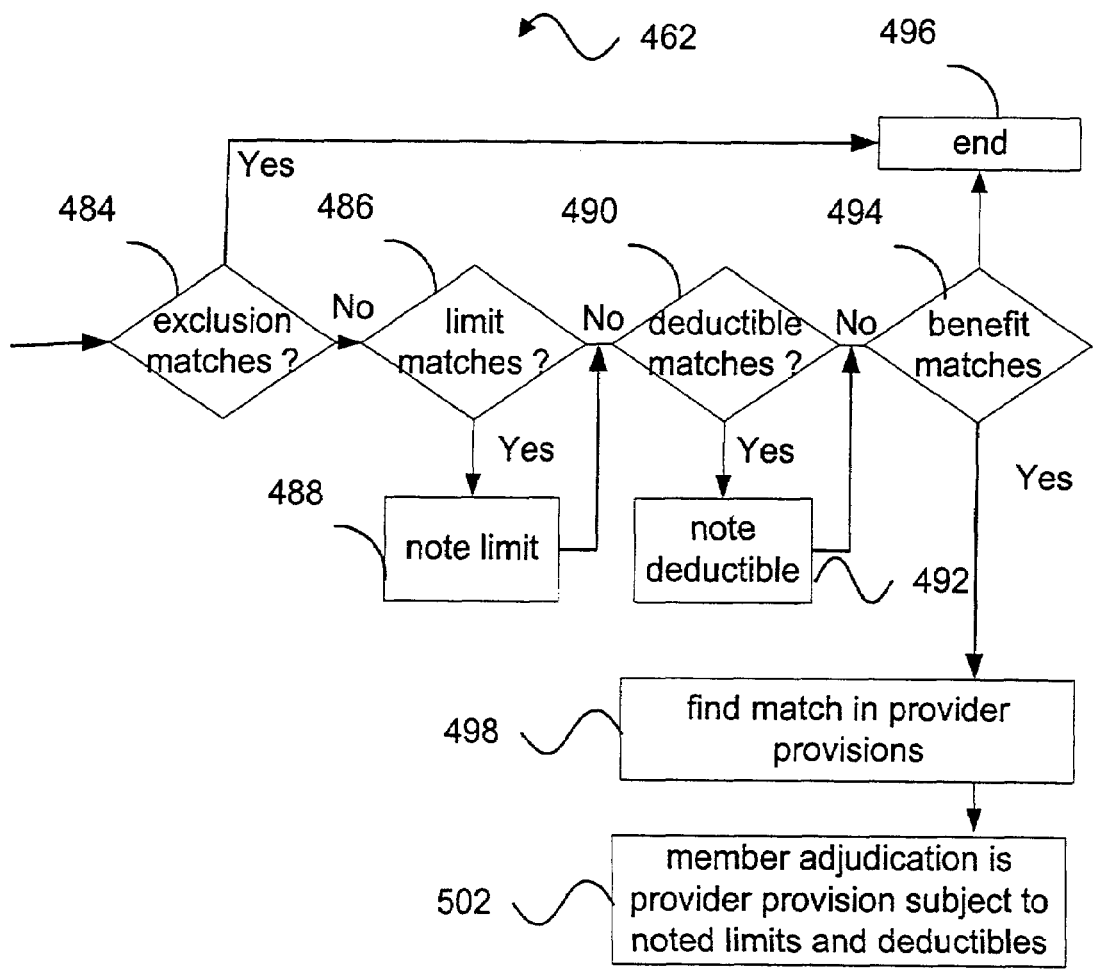
FIG. 12 is a flow-chart of a process for determining provisions that match a claim.

FIG. 12 depicts the adjudication process 462 in greater detail. The process 462 initially checks 484 for exclusion provisions that match the claim. If such exclusions exist, and completely resolve the claim, the process 462 can adjudicate the claim without reference to the remaining benefit schedule. If the exclusion provisions do not wholly resolve the claim, the process 462 can check 486, 490 and note 488, 492 limits and/or deductibles. The process 462 also checks 494 for matching benefit provisions. Based on the indemnification specified by a benefit provision and any noted limits and/or deductibles, the process can determine a final adjudication for the claim.

Often, the indemnification clause of a health plan provision refers to a provider contract for determining an amount owed to a member. For example, a health plan contract may cover a member for some percentage of the cost owed to the provider under the provider contract. Thus, the process 462 may also search 498 for matching provisions in a provider contract. Based on the applicable limits, deductibles, benefits, and provider reimbursement provisions, the process 502 determines amounts owed by the member and amounts owed to the provider.

Figure 13:
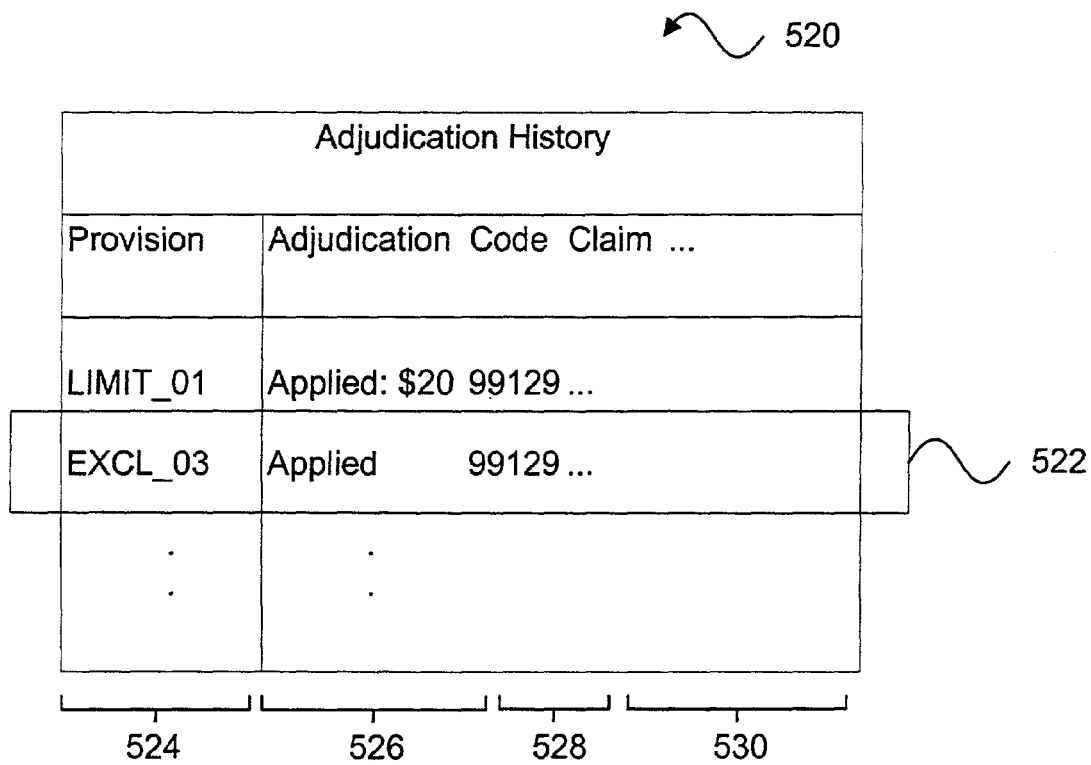
FIG. 13 is a diagram illustrating logging.

As described above, the adjudication system may log application of different provisions. For example, as shown in FIG. 13, a log 520 may store identification of an agreement, an agreement provision 534, the outcome of application of the provision 536, and other information such as a claim code 528, identification of the member/or provider, the claim 530, and so forth. The log may also include specification of limits, maximums, and deductibles that applied. Statistical analysis of the log information can identify frequently applied provisions, the costs associated with offering such provisions, and other information.

A system including the adjudication engine can automatically handle disbursements and paperwork associated with the adjudication decision reached. However, the system may determine whether or not to do so. For example, the system may report claims lacking sufficient information for human review.

For example, a claim may lack sufficient information to unmistakably identify a particular member or provider. For instance, many providers do not have a unique provider identification number (e.g., a HIPPA number). To complicate matters, providers often have multiple network memberships, provider relationships, service addresses, and billing entities. Thus, the adjudication process may determine whether to auto adjudicate the claim, for example, based on the information extracted from the claim.

Figures 14, 15:
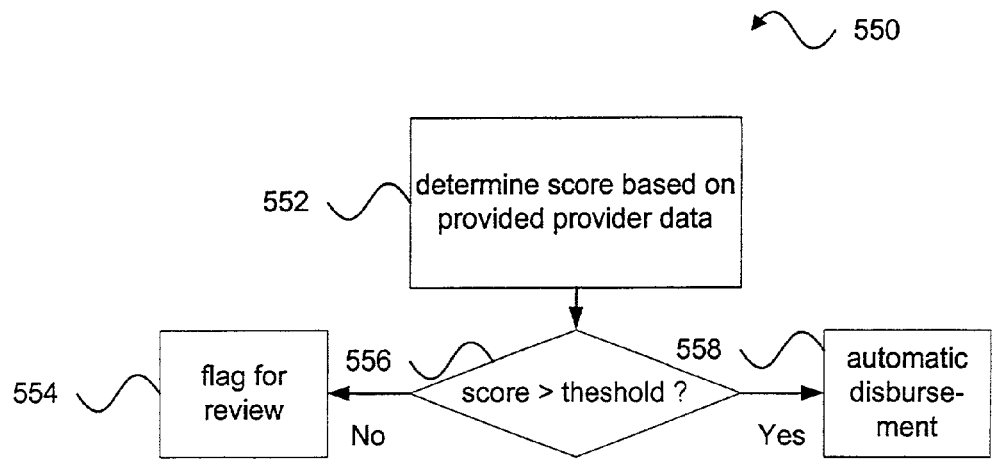
FIG. 14 is a flow-chart of a process for determining whether a claim has sufficient information to identify a provider.
FIG. 15 is a diagram illustrating weights assigned to different provider information.

As shown in FIG. 14, a process 550 may determine 552 a score that represents confidence that the claim includes sufficient information to identify a particular provider. If this score exceeds a threshold 556, the process 550 may automatically notify parties of the auto-adjudication decision and handle disbursements 558 as needed. Alternatively 554, the process 550 may notify a claim examiner that the adjudication of the claim may require human review. FIG. 15 shows a sample table 570 that designates weights 574 of different pieces of provider information 572 that a claim may include. For example, if a claim includes a provider's last name and Social Security number, the claim receives a score of twelve. The threshold and weights can be adjusted to minimize or balance errors associated with proceeding with an incorrectly identified provider and costs associated with failing to proceed when a provider can be correctly identified.

Figures 16, 17:
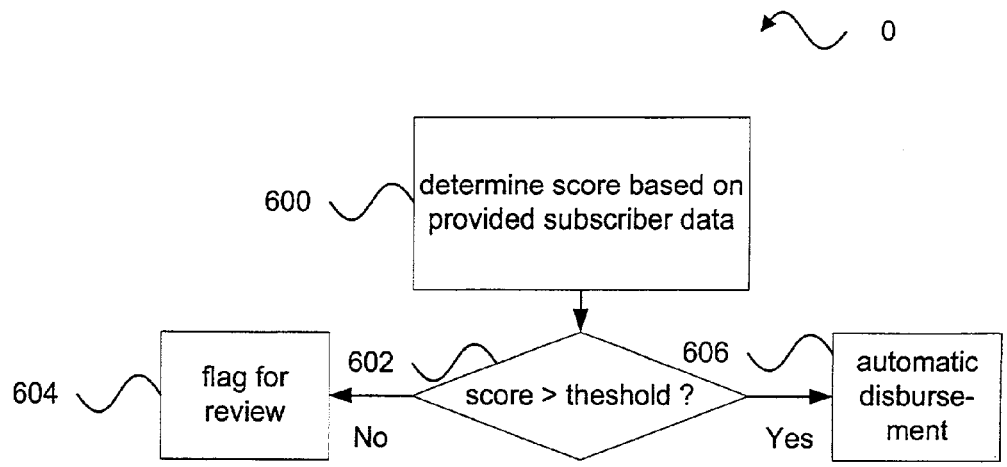
FIG. 16 is a flow-chart of a process for determining whether a claim has sufficient information to identify a member.
FIG. 17 is a diagram illustrating weights assigned to different member information.

Similarly, FIG. 16 shows a process 600 for determining whether a claim should be flagged for review prior to disbursement based on the sufficiency of information identifying a particular member. Again, the process 600 determines 600 a score based on member information extracted from a claim. If this score exceeds 602 a threshold, automatic disbursement and notification may proceed 606, otherwise the process 600 flags 604 the claim for further review.

FIG. 17 shows a sample table 612 that designates weights 616 of different pieces of member information 614. Again, these weights may be adjusted to improve performance.

In addition to auto-adjudication, the system can ease the task of plan contract development. For example, FIG. 18 shows a graphical user interface 300 that enables a user to quickly enter plan information using familiar user interface controls such as fields 302-308, radio buttons, and so forth. Based on information entered by a user into the graphical user interface 300, a procedure can generate expressions 310 of provisions in the context free grammar. The user interface can restrict user input to valid entries.

The graphical user interface 300 may be encoded in a variety of ways. For example, the user interface may be specified by SGML (structure generalized markup language) instructions such as HTML (Hypertext Markup Language). Such instructions may be transmitted to remote users over a network such as the Internet. Instructions for translating the user input into the context free grammar expressions may be included in the instructions transmitted over the network, for example, as a script or applet. Alternatively, the instructions may reside on a Web server, for example, as servlet instructions.

Other features that ease plan and contract design include the ability to automatically detect "intersecting" provisions that cover the same subject matter. These intersecting provisions may represent contradictory provisions. The system can identify such provisions during plan design and/or during claim processing.

Figure 19:
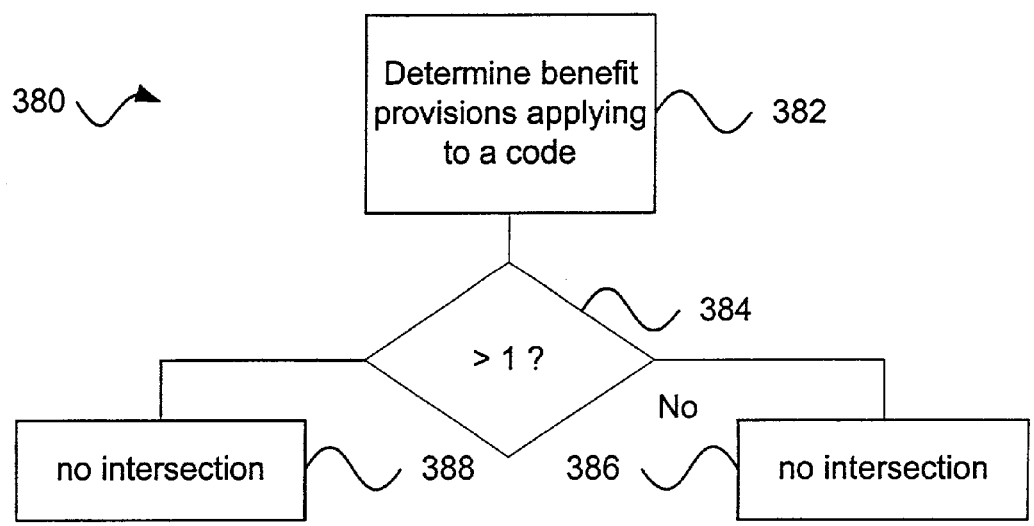
FIG. 19 is a flow-chart of a process for determining whether provisions intersect.

FIG. 19 shows a flow-chart of a process 380 for identifying intersecting provisions. As shown, the process 380 identifies 382 different benefit provisions including a reference to the same health service code. If it is determined 384 that only one provision applies to a code, the provisions are deemed not to intersect 386, whereas if more than one applies, the provisions are deemed to intersect 388. Provisions referring to the same code may intersect.

Figure 20:
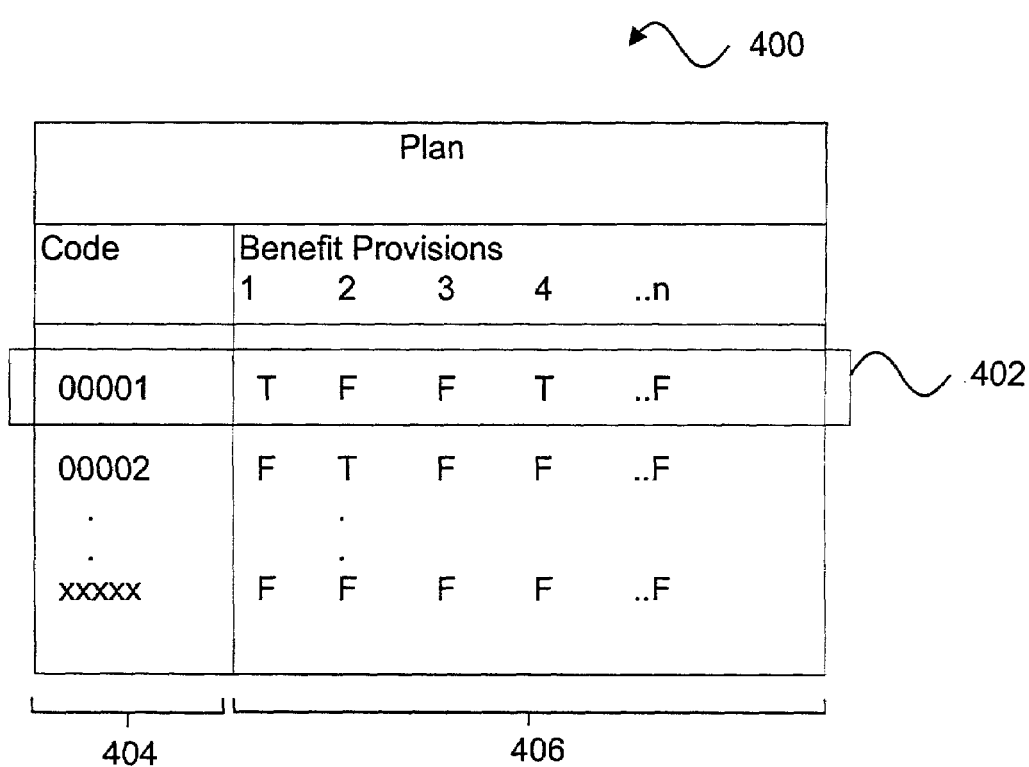
FIG. 20 is a diagram of data used to identify intersecting provisions.

FIG. 20 depicts a table of information 400 that may be used to identify potential conflicts. As shown, the table 400 includes a vector of Boolean values for each health service code 404. Each Boolean value 406 corresponds to a different provision. For example, bit-1 of the vector corresponds to provision #1. A conflict checking process sets the Boolean value of the bit to "true" if the corresponding provision refers to the health code. If a vector 402 includes more than one "true", then a provision conflict may exist. The criteria associated with the different benefit provisions can be compared to determine inconsistency in the provisions.

Of course, some provisions can intersect without raising the specter of a conflict. For example, a consistent agreement may include a limit, deductible, and benefit provision specifying the same service code. However, two benefit provisions for the same service code may indicate that the provisions potentially conflict.

Figure 21:
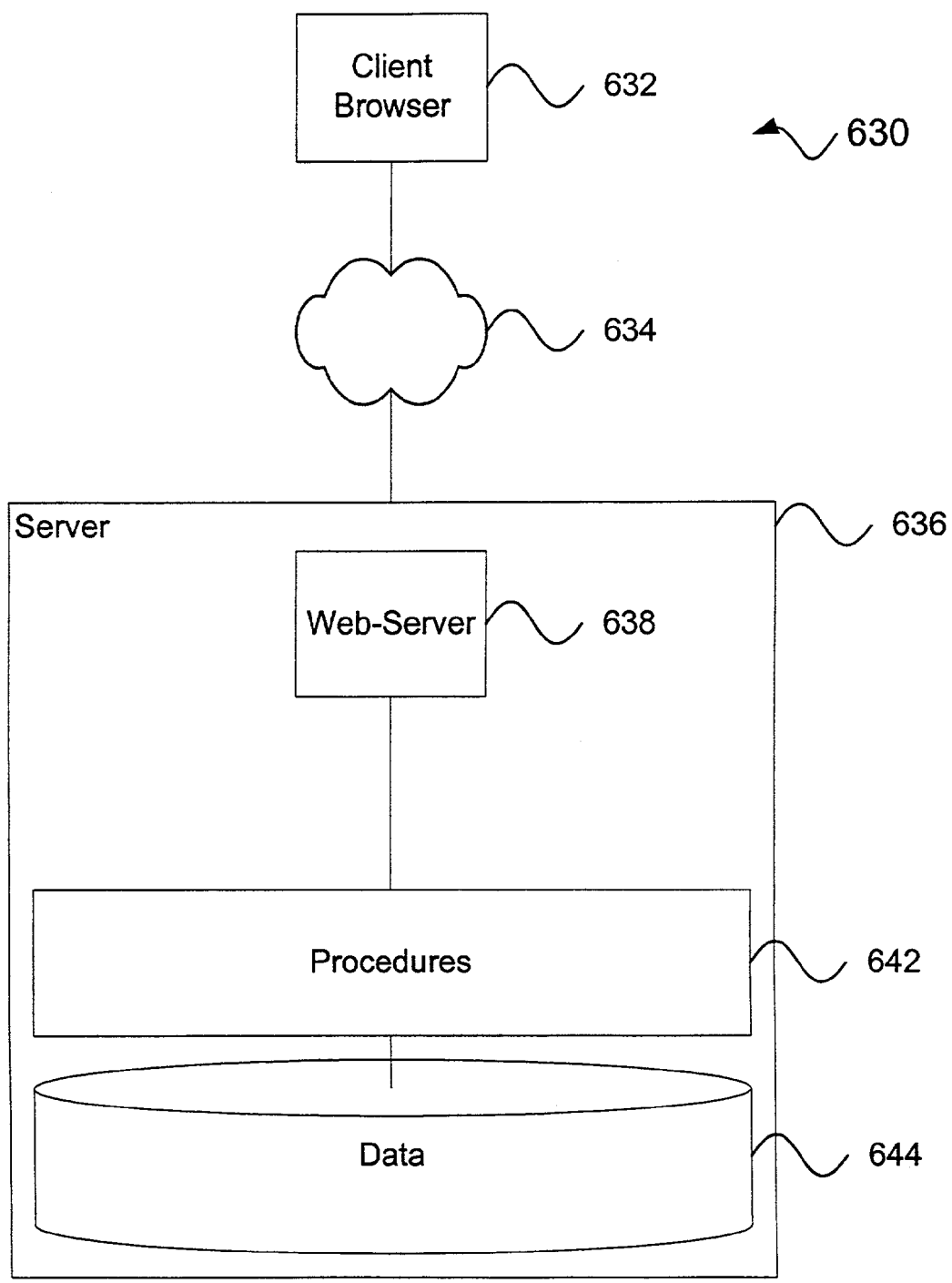
FIG. 21 is a diagram of a network based system for processing claims.

The systems described herein may be implemented as stand-alone applications. Alternatively, a server may provide access to the systems over a network. For example FIG. 21 depicts a server 636 that communicates with a client 632, such as a Web browser, over a network 634. As shown, the server 636 includes web-server instructions 638, such as Apache™ instructions, for handling network communication. The server 636 also includes instructions 642 and data 644 for providing application logic.

In embodiments featuring network communication, the server 636 may receive claims, specifications of health plans, provider contracts, and other information over the network. For example, such information may be encoded in XML (extensible markup language) and/or EDI.

Figure 22:
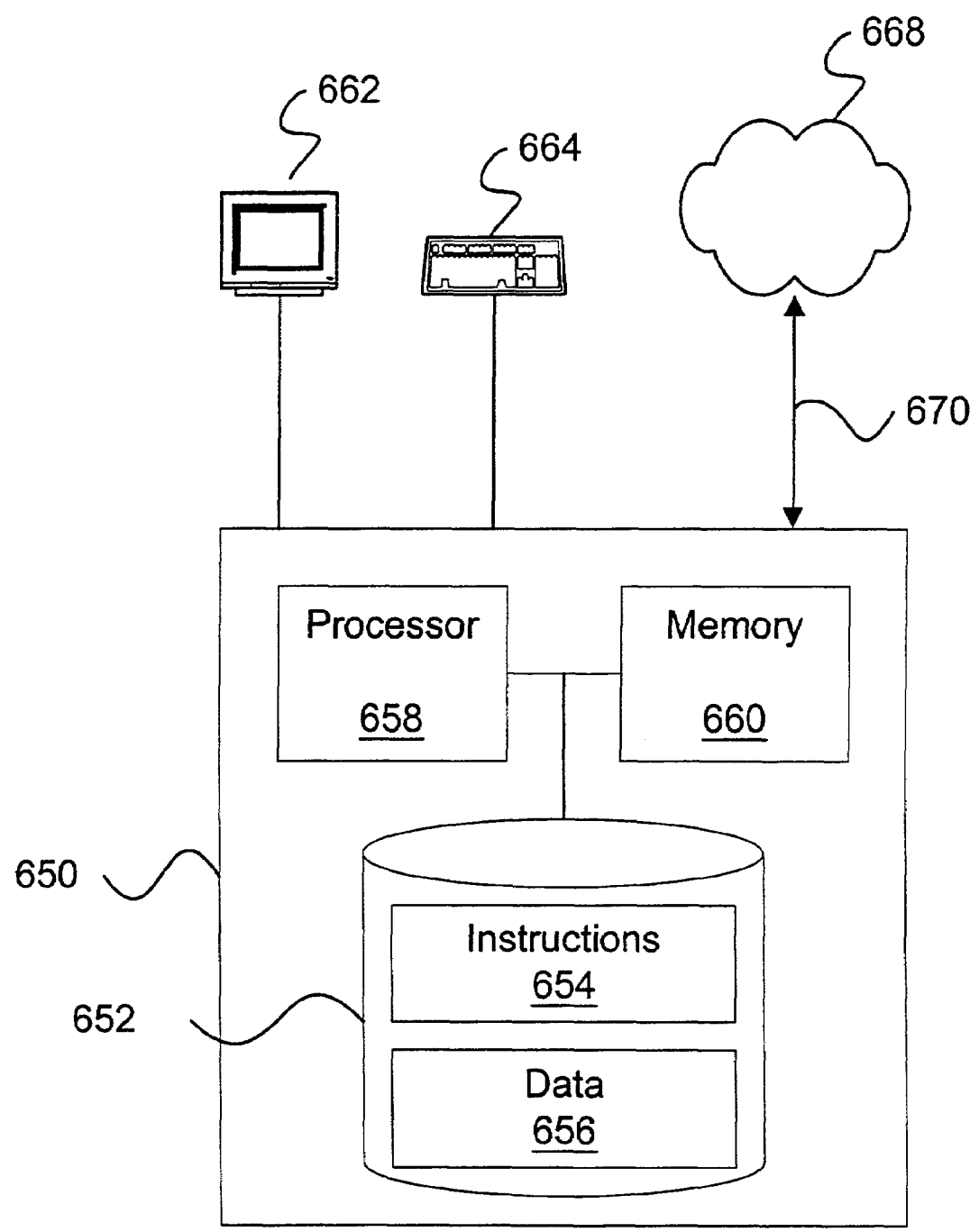
FIG. 22 is a diagram of a computer platform suitable for executing instructions that process claims.

FIG. 22 depicts a computer platform 650 suitable for executing instructions 654 that provide the claim processing features described herein. The computer 650 includes a processor 658, volatile memory 660, and non-volatile memory 652. The non-volatile memory 652 may store the claim processing instructions 654 and data 656 such as subscriber and provider data. The instructions 654 and data 656 may be transferred from non-volatile memory 652 to volatile memory 660 and a processor 658 in the course of operation. As shown the computer platform 650 may receive input via user input devices such as a keyboard 664. Additionally, the platform 650 can present information such as a particular claim, adjudication, or set of provisions on a video display 662 or other output device. The computer platform 650 may also include a connection 678 to a network 668 for sending and receiving information to and from remote networked devices.

The techniques described herein are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-implemented method of processing a claim, the method comprising:

receiving information corresponding to a context free grammar expression of at least one provision governing claim adjudication;

receiving information corresponding to a claim;

calculating a score representing a confidence that the received information corresponding to the claim includes sufficient information to identify a provider and a member; and determining if the calculated score exceeds an auto-adjudication threshold, and if so, automatically determining whether the at least one provision applies to the claim based on the received information corresponding to the context free grammar expression of the at least one provision and the received information corresponding to the claim, thereby facilitating the automatic processing of the claim based on the determination.

2. The method of claim 1, wherein the context free grammar comprises a Backus-Naur format grammar.

3. The method of claim 1,
wherein the context free grammar expression of the at least one provision includes expression of application criteria for the provision; and
wherein determining whether the at least one provision applies to the claim includes evaluating the expression using the received information corresponding to the claim.

4. The method of claim 1, further comprising automatically adjudicating the claim based on the at least one provision that applies to that claim.

5. The method of claim 4, wherein adjudicating comprises at least one of the following: determining an obligation owed to another party and determining an amount owed from another party.

6. The method of claim 4, further comprising logging identification of the provision determined to apply to the claim along with information corresponding to the adjudication.

7. The method of claim 6, further comprising generating a report by analyzing different adjudications of the provision.

8. The method of claim 1, wherein the received information corresponding to the context free grammar expression of the at least one provision comprises information determined by parsing the context free grammar expression.

9. The method of claim 1, wherein the received information corresponding to the context free grammar expression of the at least one provision includes information corresponding to a tree generated by parsing the context free grammar expression.

10. The method of claim 1, further comprising parsing the context free grammar expression.

11. The method of claim 10, further comprising generating a tree from the parsing of the context free grammar expression.

12. The method of claim 1, further comprising
providing a graphical user interface for receiving user input identifying provision elements; and
generating an expression of the provision in the context free grammar based on the received user input.

13. The method of claim 1, wherein receiving information corresponding to at least one provision comprises receiving information corresponding to more than one provision.

14. The method of claim 13, wherein determining whether the at least one provision applies to the claim comprises determining more than one provision applies.

15. The method of claim 13, wherein the more than one provisions comprise one or more provisions included in an agreement.

16. The method of claim 13, wherein the more than one provisions comprise provisions included in different agreements.

17. The method of claim 1, wherein the at least one provision comprises a provision included in a healthcare plan.

18. The method of claim 1, wherein the at least one provision comprises a provision included in a provider contract.

19. The method of claim 1, wherein the at least one provision comprises a provision corresponding to a policy regarding claim coverage.

20. The method of claim 1, wherein the at least one provision comprises a provision corresponding to a regulation.

21. The method of claim 1, wherein receiving information corresponding to a claim comprises receiving information over a network.

22. The method of claim 1, wherein the claim comprises a claim having at least one code corresponding to a healthcare service, procedure, or tangible article.

23. The method of claim 22, wherein the code comprises an AMA (American Medical Association) code.

24. The method of claim 1, further comprising extracting the information corresponding to the claim from information included on a health insurance claim form.

25. The method of claim 24, wherein the health insurance claim form comprises a HCFA form.

26. The method of claim 24, wherein the extracting comprises at least one of the following: extracting from a hardcopy of the form and extracting from an electronic data structure storing form data.

27. A computer-implemented method of processing a health insurance claim, the method comprising:
receiving information corresponding to a context free grammar expression of different provisions governing adjudication of the claim;
receiving information corresponding to a claim;
calculating a score representing a confidence that the received information corresponding to the claim includes sufficient information to identify a provider and a member; and
determining if the calculated score exceeds an auto-adjudication threshold, and if so, automatically determining whether the at least one provision applies to the claim based on the received information corresponding to a context free grammar expression of the different provisions and the received information corresponding to the claim, thereby facilitating the automatic processing of the claim based on the determination.

28. The method of claim 27, wherein the context free grammar comprises a Backus-Naur format grammar.

29. The method of claim 28, further comprising adjudicating the claim based on the at least one of the provisions that applies to the claim.

30. The method of claim 29, wherein adjudicating the claim includes accessing a history of previously adjudicated claims.

31. The method of claim 30, wherein accessing a history of previously adjudicated claims includes accessing a history of previously adjudicated claims for a single healthcare plan member.

32. The method of claim 30, further comprising determining benefits owed to the healthcare plan member.

33. The method of claim 32, further comprising generating an explanation of benefits for the determined benefits.

34. The method of claim 27, wherein the provisions comprise provisions included in a healthcare plan.

35. The method of claim 34, wherein the provisions comprise provisions excluding coverage.

36. The method of claim 34, wherein the provisions comprise provisions limiting coverage.

37. The method of claim 34, wherein the provisions comprise provisions governing coverage deductibles.

38. The method of claim 34, wherein the provisions comprise provisions expressing calculation of benefits.

39. The method of claim 34, wherein the provisions comprise provisions included in a provider contract describing reimbursement owed to a provider.

40. The method of claim 38, wherein the provisions expressing calculation of benefits comprise provisions referring to a provider contract.

41. The method of claim 27, wherein the provisions comprise provisions in a benefit schedule.

42. The method of claim 41, wherein the benefit schedule comprises at least one of the following provisions: a provision excluding coverage, a provision limiting coverage, a provision indicating a coverage deductible, and a provision expressing calculation of benefits.

43. The method of claim 41, wherein the provisions comprise different benefit schedules.

44. The method of claim 43, wherein the different benefit schedules comprise at least one of the following: a default benefit schedule, an in-network benefit schedule, and out-of-network benefit schedule.

45. The method of claim 43, further comprising determining which, if any, of the different benefit schedules applies to the claim.

46. The method of claim 27, further comprising determining reimbursement owed to the provider for the claim.

47. The method of claim 46, further comprising generating an explanation of reimbursement for the determined reimbursement.

48. The method of claim 27, wherein the provisions comprise provisions corresponding to a healthcare company policy.

49. The method of claim 27, wherein the provisions comprise provisions corresponding to regulations.

50. The method of claim 27, wherein more than one of the provisions applies to the claim.

51. The method of claim 27, further comprising determining whether to review a claim by hand.

52. The method of claim 51, wherein determining comprises determining based on an estimation that a particular member can be correctly identified based on information corresponding to the claim.

53. The method of claim 52, wherein the estimation comprises an estimation based on a weighting of different member information included in the claim.

54. The method of claim 51, wherein determining comprises determining based on an estimation that a provider can be correctly identified.

55. The method of claim 54, wherein the estimation comprises an estimation based on a weighting of different provider information included in the claim.

56. The method of claim 27, wherein receiving information comprises receiving text of the context free grammar expression of the provisions.

57. The method of claim 56, further comprising parsing the received text of the context free grammar expression of the provisions.

58. The method of claim 57, further comprising generating information corresponding to a tree from the parsing.

59. The method of claim 27, wherein receiving information comprises receiving information produced by parsing the context free grammar expression of the provisions.

60. The method of claim 59, wherein receiving information comprises receiving information corresponding to a tree generated by parsing the context free grammar expression of the provisions.

61. The method of claim 27, further comprising storing information corresponding to a tree based on a parsing of the context free grammar, each provision represented by one or more tree nodes; and wherein determining whether a provision applies comprises traversing the tree to identify tree nodes corresponding to the claim.

62. The method of claim 61, wherein at least some tree nodes include terminal values of the context free grammar;

wherein the information corresponding to the claim comprises information including a terminal value of the context free grammar, and wherein traversing the tree to identify tree nodes corresponding to the claim correspond identifying a terminal value included in the tree and included in the information corresponding the claim.

63. The method of claim 62, wherein traversing the tree comprises determining a sub-tree to traverse and indexing to the sub-tree.

64. The method of claim 63, wherein determining the sub-tree to traverse comprises determining a sub-tree corresponding to one of the following: an exclusions sub-tree, a limits sub-tree, a deductibles sub-tree, and a benefits sub-tree.

65. The method of claim 64, further comprising:

if a provision in the exclusions sub-tree applies to the claim, not traversing the limits sub-tree, the deductibles sub-tree, or the benefits sub-tree for the claim.

66. The method of claim 63, wherein determining the sub-tree to traverse comprises determining a benefit schedule that applies to the claim.

67. The method of claim 27, wherein information corresponding to the claim comprises one or more healthcare codes.

68. The method of claim 67, further comprising bundling a first set of more than one healthcare code into a second set having fewer healthcare codes than the first set.

69. The method of claim 67, further comprising replacing a healthcare code with a different healthcare code.

70. The method of claim 27, further comprising:

providing a user interface that receives user input corresponding to provisions; and based on the received user input, generated the context free grammar expression of the provisions.

71. The method of claim 27, further comprising determining if the provisions conflict at design time.

\* \* \* \* \*